Figure 1:
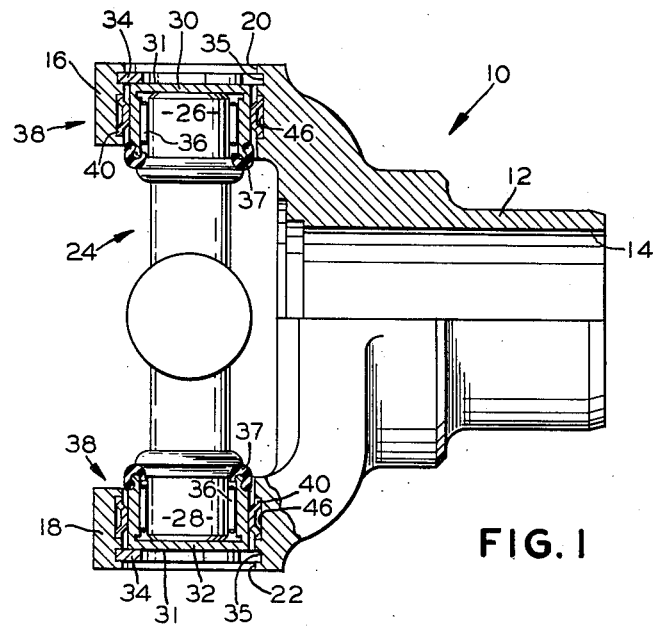

Aug. 25, 1964   J. M. LYONS   3,145,547
ALIGNMENT DEVICE
Filed Dec. 28, 1961

United States Patent Office 3,145,547
Patented Aug. 25, 1964

3,145,547
ALIGNMENT DEVICE
James M. Lyons, Toledo, Ohio, assignor to Dana Corporation, Toledo, Ohio, a corporation of Virginia
Filed Dec. 28, 1961, Ser. No. 162,869
1 Claim. (Cl. 64—17)

This invention relates to aligning devices in general and more particularly to means for insuring the alignment of a journal cross and bearing race assembly relative to a universal joint member mounting the same.

In the usual Cardan type universal point, the torque transferring element joining the driving and driven member of the joint comprisese a journal cross in the form of a star shaped element having two pairs of opposed trunnions; these trunnions normally being disposed in equal circumferential spaced relationship and each rotatably received in a bearing race. Interposed between the bearing race and the trunnion are the usual plurality of needle bearings. The driving and driven members of the universal joint are each provided with a pair of opposed lugs which have aligned openings therein for securedly receieving a pair of the races disposed on opposed journal cross trunnions. In this manner the driving and driven members are joined for universal pivotal movement.

A great difficulty has been present in prior art structures of this type in that in order to have proper operation of the joint assembly and reasonable wear at the bearing race and trunnion engagement, which engagement is through needle bearings or the like, the bearing races must be positioned by the openings in the lugs on the driving and driven members in a proper aligned relationship. If the openings are not in proper alignment, the journal cross and bearing race will not be in proper engagement resulting in non-uniform loads and excessive wear.

It is therefore an object of this invention to provide means for insuring the proper alignment between the bearing races and the receiving cross holes in the driving and driven members of a Cardan type universal joint.

It is another object of this invention to provide a driving or driven member for a Cardan type universal joint wherein means are incorporated between the bearing race assemblies and the lug cross holes to insure that the lug cross holes, bearing race, and journal cross are in proper alignment.

It is yet another object of this invention to provide means incorporated in a Cardan type universal joint so that the tolerances used in machining the cross holes in the lug members need not be held to a minimum yet proper alignment of the bearing races and lug cross holes will result.

It is a further object of this invention to provide means incorporated in a Cardan type universal joint so that lug deflection of the driving and driven members does not result in misalignment of the bearing race and journal cross assemblies.

Figure 2:
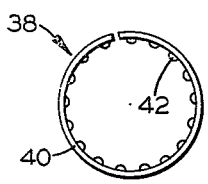
Figure 3:
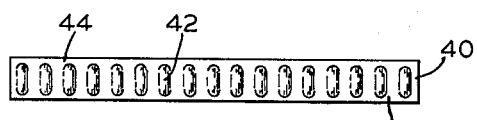
Figure 4:
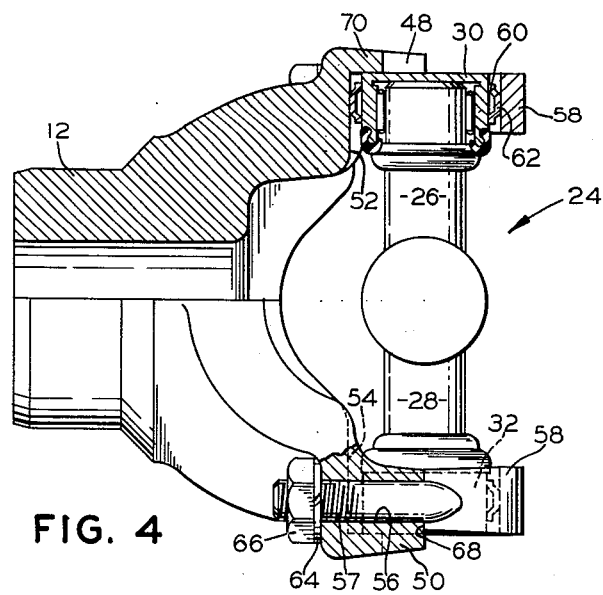

Further and other objects of this invention will become apparent upon a consideration of the specification when taken in consideration with the following drawings wherein:

FIG. 1 is a longitudinal view of a driving or driven member of a Cardan type universal joint incorporating this invention with portions cut away for added clarity, FIG. 2 is an end view of the resilient means for insertion between driving and driven member and the bearing race, FIG. 3 is a developed view of the structure shown in FIG. 2; and FIG. 4 is a longitudinal view of another embodiment of a driving or driven member of a double Cardan universal joint incorporating this invention and having portions cut away for added clarity.

In one preferred embodiment of this invention, the drive or driven member of a Cardan type universal joint, in the form of a yoke, is prepared with opposed lugs having aligned openings disposed centrally therein. Opposed trunnions of a journal cross are received in these openings, and interposed between the trunions and the openings is a bearing race. The bearing races are rotatably mounted on the trunnion and adapted to be securedly positioned in the cross holes.

The interior diameter of the cross hole is prepared so that a resilient means may be positioned between the lug and the bearing race. In this manner any misalignment or deflection of the lugs will be accommodated in the resilient means so that the bearing races disposed on the trunions will remain in proper alignment.

Referring now to the drawings and more particularly to FIG. 1, a drive or driven member of a Cardan type universal joint in the form of a yoke is shown generally at 10. Yoke 10 is formed with a barrel portion 12 having an axially extending opening 14 therein adapted for attachment to a shaft member (not shown) in a suitable manner such as by a key and the like. However, the method of attachment to a shaft member forms no part of this invention and any well known method may be used. Axially extending from the barrel 12 are a pair of aligned lugs 16 and 18 disposed in spaced apart parallel relationship. Each lug 16 and 18 is provided with a centrally disposed radially extending opening or cross hole 20 and 22 respectively, which openings are disposed in aligned relationship. The openings 20 and 22 are normally machined simultaneously in a single operation and finished so that they are in exacting alignment.

A journal cross shown generally at 24 of the usual type having four trunnions thereon in paired opposed relationship, one pair of which is shown at 26 and 28, is pivotally carried by the yoke 10. More particularly, each trunnion 26 and 28 has rotatably mounted thereon a bearing race 30 and 32 respectively. The race 30 being disposed in the opening 20 and the race 32 being disposed in the opening 22 in the yoke 10. A snap ring 34 is positioned in a groove 35 disposed at the outer end of each opening 20 and 22 and abuttingly engages the back face 31 of the bearing races 30 and 32 to prevent outward movement thereon. Interposed between each trunnion 26 and 28 and its respective bearing race 30 and 32 are a plurality of needle bearings 36, which bearings provide substantially frictionless rotation between the trunnions and the bearings. A seal 37 abuttingly engages each bearing 30 and 32 and its associated trunnion 26 and 28 to prevent the escape of lubricant therebetween.

The structure defined to this point is substantially conventional in nature, and, although it is operable, it has an inherent shortcoming in that misalignment between the cross holes 20 and 22 causes misalignment of the bearing races 30 and 32 and results in a poorly operating joint. To prevent misalignment of the bearing races 30 and 32 because of misalignment of the cross holes 20 and 22, a resilient means shown generally at 38 is interposed between each bearing 30 and 32 at its respective cross hole 20 and 22.

As viewed in FIG. 2, the resilient means 38 takes the form of an annular ring 40 having a plurality of prominences or dimples 42 provided on the inner surface thereof. The preferred configuration of the surface of ring 40 maintains the prominences 42 restricted within the borders of the ring 40 so that a flat portion 44 is present on each side of the dimples 42. The flat portions 44 are provided to strengthen the ring 40 and also for location purposes.

More particularly, each cross hole 20 and 22 is provided with a groove 46 which is prepared to cooperate and positionably receive the ring 40 and abuttingly retain the same against movement relative to the cross hole. The ring 40 is positioned in the groove 46 with the dimples or prominences 42 extending radially inwardly from the ring 40 into engagement with the outer surface of the bearing races 30 and 32. The prominences may be formed so as to project outwardly, inwardly or simultaneously some outwardly and some inwardly. The dimensions of the cross holes 20 and 22, the grooves 46, the resilient means 38 and the diameter of the bearings 30 and 32 are selected so that upon assembly of the races into their respective cross hole, the resilient means 38 are placed under resilient compression. In this manner the races 30 and 32 are securely positioned in the cross holes 20 or 22; however, the resilient means 38 may be further deformed to resiliently allow movement of the races. If it is desired, the groove 46 may be positioned in the bearing races with the resilient means 38 received therein and the dimples 42 extending outwardly to engage the lug 16 or 18.

It is apparent from the foregoing, that if the cross holes 20 and 22 are not in proper alignment or if the lugs 16 and 18 are deformed from their normal position, the bearings 30 and 32 on the journal 24 will be allowed to be displaced by the resilient means 38 so that they remain in alignment and properly engage the trunnion 26 or 28.

Also, if desired, the resilient means 38 may be positioned between only one of the bearings 30 or 32 and its respective lug 16 or 18, while the other bearing is fixedly positioned in its respective lug. In this manner the resiliently mounted bearing race will deform its respective resilient means to become aligned with the other.

Referring now to FIG. 4, wherein corresponding parts will be designated by the same numeral as used with respect to the embodiment shown in FIG. 1, the yoke 12 is provided with a pair of axially extending lug means 48 and 50 disposed in spaced parallel relationship. The lugs 48 and 50 differ from the lugs 16 and 18 of the embodiment of FIG. 1 in that they are prepared with aligned bearing receiving openings 52 and 54 respectively which openings are semi-cylindrical in nature and adapted to receive approximately half of the respective bearing race 30 and 32.

Each lug 48 and 50 is provided with a pair of laterally spaced bolt receiving openings, one of which is shown at 56, each opening being adapted to receive a threaded shank of a U-bolt 58. Disposed about each bearing 30 and 32 is a resilient means 60 in the form of an annular ring having a plurality of dimples or prominences 62 thereon extending radially outwardly therefrom. The U-bolts 58 are dimensioned so as to securely receive the respective bearing 30 or 32 and the surrounding resilient means 60. The threaded shank 57 is securely positioned in the opening 56 of the respective lug 48 or 50 by a lock washer 64 and bolt 66, while being provided with a shoulder 68 which abuttingly engages the outer end of the respective lug 48 or 50 so as to limit the inward movement of the U-bolt 58 whereby the U-bolt may not be tightened to the extent that the resilient means 60 is overly compressed. A shoulder 70 is provided at the base of the radial outer portion of the openings 48 and 50 and disposed so as to engage the back of the bearing races 30 and 32 respectively to prevent the outward movement thereof.

In this manner any misalignment between the lugs 48 and 50, which normally results in misalignment of the bearings 30 and 32 may be accommodated by the resilient means 60 so that the bearing races may resiliently be positioned in aligned relationship.

From the foregoing it is apparent; that means have been provided for insuring the proper alignment between the bearing races and the receiving cross holes in the driving and driven members of a Cardan type universal joint; that driving and driven members for a Cardan type universal joint have been provided wherein means are incorporated between the bearing race assembly and the lug cross holes to insure that the bearing races and journal cross are in proper alignment; that a Cardan type universal joint has been provided so that tolerances used in the machining of the cross holes in the lug portions need not be held to a minimum yet proper alignment of the bearing races and lug cross holes will result; and that a Cardan type universal joint has been provided so that lug deflection of the driving and driven member does not result in misalignment of the bearing race and journal cross assemblies.

The preferred embodiments of this invention have been shown and described, but changes and modifications can be made, and it is understood that the foregoing description is illustrative only and not for the purpose of rendering this invention limited to the details illustrated or described except insofar as they have been limited by the terms of the following claim.

What is claimed is:

An aligning device for use in a universal joint comprising,
- (A) a universal joint member having a longitudinal axis,
- (B) axially extending lug means carried by said joint member,
- (C) a bearing race means,
- (D) said lug means having a bearing receiving opening therein extending radially with respect to said axis,
- (E) said bearing race means being disposed in said bearing receiving opening,
- (F) an annular metallic resilient device disposed in said opening and compressed between said lug means and said bearing race means and engaging the same and cushioning movement of said race means toward said lug means,
- (G) said resilient device having flat lateral edges and a plurality of projections intermediate said edges engaging one of said means,
- (H) the other of said means having an annular groove therein,
- (I) the edges of said resilient device being disposed in and abuttingly positioned by said groove with said plurality of projections thereon extending from said groove,
- (J) whereby said bearing race means is resiliently connected to said lug means,
- (K) and abutment means carried by said lug means and engaging said bearing means and maintaining the latter against radial movement outwardly with respect to said axis.

References Cited in the file of this patent

UNITED STATES PATENTS

| | | |
|---|---|---|
| 1,943,814 | Cutting | Jan. 16, 1934 |
| 2,336,579 | Venditty et al. | Dec. 14, 1943 |
| 2,650,866 | Knudson | Sept. 1, 1953 |

FOREIGN PATENTS

| | | |
|---|---|---|
| 168,666 | Great Britain | Sept. 5, 1921 |
| 712,677 | France | July 27, 1931 |
| 1,022,182 | France | Dec. 10, 1952 |
| 147,078 | Sweden | Sept. 21, 1954 |
| 934,447 | Germany | Oct. 20, 1955 |